(12) United States Patent
Liu et al.

(10) Patent No.: US 10,009,612 B2
(45) Date of Patent: Jun. 26, 2018

(54) METHOD AND APPARATUS FOR BLOCK PARTITION OF CHROMA SUBSAMPLING FORMATS (71) Applicant: HFI INNOVATION INC., Zhubei, Hsinchu County (TW)

(72) Inventors: Shan Liu, San Jose, CA (US); Shaw-Min Lei, Hsinchu County (TW)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 288 days.

(21) Appl. No.: 14/378,969

(22) PCT Filed: Apr. 12, 2013

(86) PCT No.: PCT/CN2013/074132
§ 371 (c)(1),
(2) Date: Aug. 14, 2014

(87) PCT Pub. No.: WO2013/152736
PCT Pub. Date: Oct. 17, 2013

(65) Prior Publication Data
US 2015/0304662 A1    Oct. 22, 2015

Related U.S. Application Data (60) Provisional application No. 61/623,162, filed on Apr. 12, 2012, provisional application No. 61/705,829, (Continued)

(51) Int. Cl.
*H04N 19/159* (2014.01)
*H04N 19/96* (2014.01)
(Continued)

(52) U.S. Cl.
CPC ......... *H04N 19/159* (2014.11); *H04N 19/122* (2014.11); *H04N 19/157* (2014.11);
(Continued)

(58) Field of Classification Search
None
See application file for complete search history.

(56) References Cited

U.S. PATENT DOCUMENTS

2007/0110153 A1* 5/2007 Cho ................... H04N 19/176
375/240.12
2007/0297511 A1* 12/2007 Chiu .................... H04N 19/51
375/240.16
(Continued)

FOREIGN PATENT DOCUMENTS

CN    1874521 A    12/2006
CN    101252695 A   8/2008
EP    2202986 A1    6/2010

OTHER PUBLICATIONS

Minezawa, A., et al.; "Improvement to chroma TU specification;" Joint Collaborative Team on Video Coding (JCT-VC) of ITU-T SG16 WP3 and ISO/IEC JTC1/SC29/WG11; Nov. 2011; pp. 1-24.
(Continued)

*Primary Examiner* — Kate Luo
(74) *Attorney, Agent, or Firm* — McClure, Qualey & Rodack, LLP (57) ABSTRACT A method and apparatus for video data processing for video in YUV422 or YUV 444 formats are disclosed. In one embodiment, for a 2N×2N luma coding unit (CU) in YUV422 format, the transform process partitions residue data corresponding to the 2N×2N luma CU and the N×2N chroma CU into square luma and chroma transform units (TUs). The residue data associated with the luma and the chroma CUs are generated by applying prediction process to the luma CU and the chroma CU. The transform process is independent of prediction block size or prediction mode associated with the prediction process. In another embodiment, the prediction process splits the CU into two prediction blocks. Transform process is applied on the chroma
(Continued)

residue data corresponding to the chroma CU to form one or more chroma TUs, wherein the transform process is dependent on CU size and prediction block size, or CU size and prediction mode.

14 Claims, 8 Drawing Sheets

Related U.S. Application Data filed on Sep. 26, 2012, provisional application No. 61/720,414, filed on Oct. 31, 2012.

(51) Int. Cl.
| | |
|---|---|
| H04N 19/186 | (2014.01) |
| H04N 19/61 | (2014.01) |
| H04N 19/122 | (2014.01) |
| H04N 19/176 | (2014.01) |
| H04N 19/157 | (2014.01) |

(52) U.S. Cl.
CPC ......... *H04N 19/176* (2014.11); *H04N 19/186* (2014.11); *H04N 19/61* (2014.11); *H04N 19/96* (2014.11)

(56) References Cited

U.S. PATENT DOCUMENTS

| | | | | |
|---|---|---|---|---|
| 2008/0253463 | A1* | 10/2008 | Lin | H04N 19/176 375/240.25 |
| 2009/0116554 | A1* | 5/2009 | Ma | H04N 19/513 375/240.16 |
| 2011/0170012 | A1* | 7/2011 | Cheon | H04N 19/46 348/725 |
| 2011/0243225 | A1* | 10/2011 | Min | H04N 19/44 375/240.12 |
| 2011/0255591 | A1 | 10/2011 | Kim et al. | |
| 2012/0051425 | A1* | 3/2012 | Chong | H04N 19/176 375/240.12 |

OTHER PUBLICATIONS

Silcock, P., et al.; "AHG12-Extension of HM7 to Support Additional Chroma Formats;" Joint Collaborative Team on Video Coding (JCT-VC) of ITU-T SG16 WP3 and ISO/IEC JTC1/SC29/WG11; Jul. 2012; pp. 1-16.

Sugimoto, K., et al.; "CE2 4.2—report on fixed TU depth for chroma;" Joint Collaborative Team on Video Coding (JCT-VC) of ITU-T SG16 WP3 and ISO/IEC JTC1/SC29/WG11; Feb. 2012; pp. 1-14.

McCann, K., et al.; "High Efficiency Video Coding (HEVC) Test Model 5 (HM5) Test Model 5 Encoder Description;" Joint Collaborative Team on Video Coding (JCT-VC) of ITU-T SG16 WP3 and ISO/IEC JTC1/SC29/WG11; Nov. 2011; pp. 1-45.

McCann, K., et al.; "High Efficiency Video Coding (HEVC) Test Model 6 (HM6) Encoder Description;" Joint collaborative Team on Video Coding (JCT-VC) of ITU-T SG16 WP3 and ISO/IEC JTC1/SC29/WG11; Feb. 2012; pp. 1-42.

\* cited by examiner

METHOD AND APPARATUS FOR BLOCK PARTITION OF CHROMA SUBSAMPLING FORMATS

CROSS REFERENCE TO RELATED APPLICATIONS

The present invention claims priority to U.S. Provisional Patent Application Ser. No. 61/623,162, filed Apr. 12, 2012, entitled "A new big CU coding method for video coding in HEVC", U.S. Provisional Patent Application Ser. No. 61/705,829, filed Sep. 26, 2012, entitled "Coding, prediction and transform block structure for video compression in YUV422 format", and U.S. Provisional Patent Application Ser. No. 61/720,414, filed Oct. 31, 2012, entitled "Coding, prediction and transform block structure for YUV 422 format. The U.S. Provisional patent applications are hereby incorporated by reference in their entireties.

TECHNICAL FIELD

The present invention relates to video coding system. In particular, the present invention relates to method and apparatus for block structure of coding block, prediction block and transform block of video having YUV422/444 subsampling format.

BACKGROUND

Motion estimation is an effective inter-frame coding technique to exploit temporal redundancy in video sequences. Motion-compensated inter-frame coding has been widely used in various international video coding standards The motion estimation adopted in various coding standards is often a block-based technique, where motion information such as coding mode and motion vector is determined for each macroblock or similar block configuration. In addition, intra-coding is also adaptively applied, where the picture is processed without reference to any other picture. The inter-predicted or intra-predicted residues are usually further processed by transformation, quantization, and entropy coding to generate compressed video bitstream. During the encoding process, coding artifacts are introduced, particularly in the quantization process. In order to alleviate the coding artifacts, additional processing has been applied to reconstructed video to enhance picture quality in newer coding systems. The additional processing is often configured in an in-loop operation so that the encoder and decoder may derive the same reference pictures to achieve improved system performance.

Figure 1A:
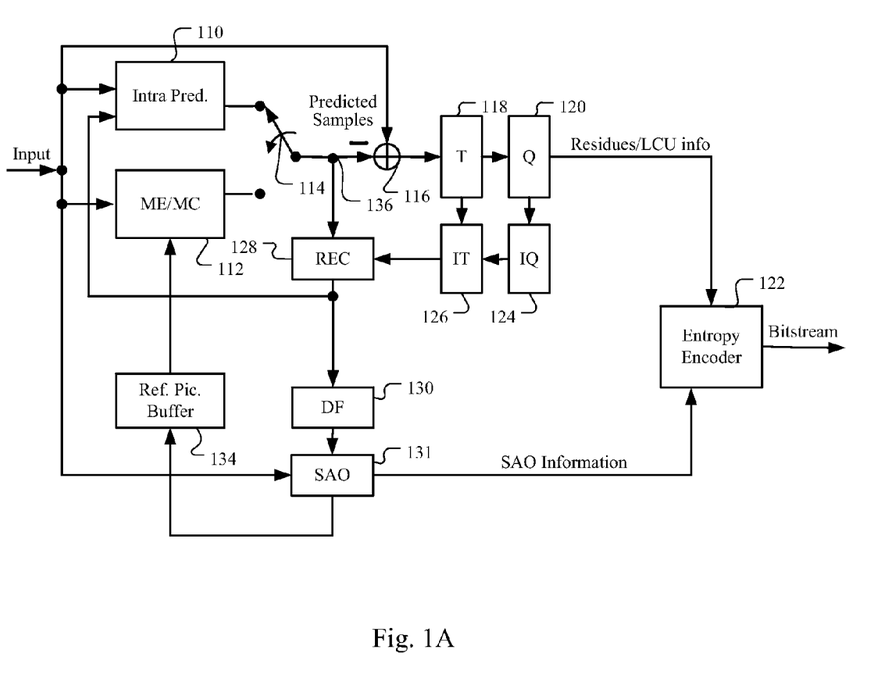
FIG. 1A illustrates an exemplary adaptive inter/intra video encoder associated with an HEVC coding system.

FIG. 1A illustrates an exemplary system block diagram for an video encoder based on High Efficiency Vide Coding (HEVC) using adaptive Inter/Intra prediction. For Inter-prediction, Motion Estimation (ME)/Motion Compensation (MC) 112 is used to provide prediction data based on video data from other picture or pictures. Switch 114 selects Intra Prediction 110 or Inter-prediction data and the selected prediction data is supplied to Adder 116 to form prediction errors, also called residues. The prediction error is then processed by Transformation (T) 118 followed by Quantization (Q) 120. The transformed and quantized residues are then coded by Entropy Encoder 122 to form a video bitstream corresponding to the compressed video data. The bitstream associated with the transform coefficients is then packed with side information such as motion, mode, and other information associated with the image area. The side information may also be subject to entropy coding to reduce required bandwidth. Accordingly, the data associated with the side information are provided to Entropy Encoder 122 as shown in FIG. 1A. When an Inter-prediction mode is used, a reference picture or pictures have to be reconstructed at the encoder end as well. Consequently, the transformed and quantized residues are processed by Inverse Quantization (IQ) 124 and Inverse Transformation (IT) 126 to recover the residues. The residues are then added back to prediction data 136 at Reconstruction (REC) 128 to reconstruct video data. The reconstructed video data may be stored in Reference Picture Buffer 134 and used for prediction of other frames.

As shown in FIG. 1A, incoming video data undergoes a series of processing in the encoding system. The reconstructed video data from REC 128 may be subject to various impairments due to a series of processing. Accordingly, various in-loop processing is applied to the reconstructed video data before the reconstructed video data are stored in the Reference Picture Buffer 134 in order to improve video quality. In the High Efficiency Video Coding (HEVC) standard being developed, Deblocking Filter (DF) 130 and Sample Adaptive Offset (SAO) 131 have been developed to enhance picture quality. The in-loop filter information may have to be incorporated in the bitstream so that a decoder can properly recover the required information. Therefore, in-loop filter information from SAO is provided to Entropy Encoder 122 for incorporation into the bitstream. In FIG. 1A, DF 130 is applied to the reconstructed video first and SAO 131 is then applied to DF-processed video.

Figure 1B:
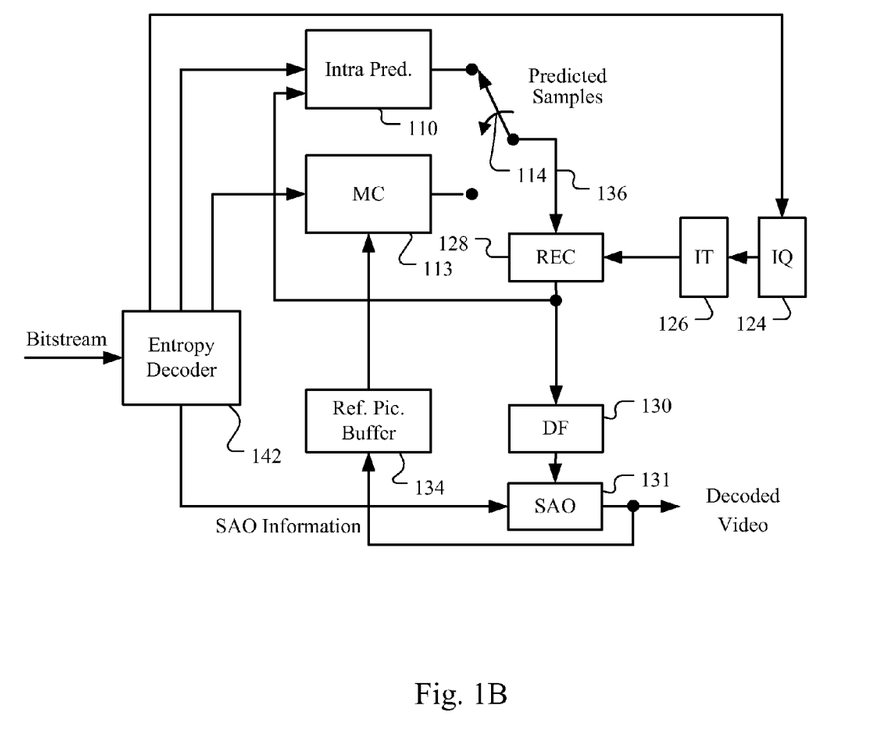
FIG. 1B illustrates an exemplary adaptive inter/intra video decoder associated with an HEVC coding system.

A corresponding decoder for the encoder of FIG. 1A is shown in FIG. 1B. The video bitstream is decoded by Video Decoder 142 to recover the transformed and quantized residues, SAO/ALF information and other system information. At the decoder side, only Motion Compensation (MC) 113 is performed instead of ME/MC. The decoding process is similar to the reconstruction loop at the encoder side. The recovered transformed and quantized residues, SAO/ALF information and other system information are used to reconstruct the video data. The reconstructed video is further processed by DF 130 and SAO 131 to produce the final enhanced decoded video.

In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU, also referred as CTU, coded tree unit in HEVC). The initial coding unit is then partitioned using quadtree. Usually, a coding system uses Rate-Distortion Optimization (RDO) to determine whether a CU should be further split. After a coding unit is split by the quadtree, the resulting coding units may be further split using quadtree unless the coding unit reaches a pre-specified smallest CU (SCU) size. The collection of quadtree partitions of a picture to form variable-size coding units constitutes a partition map for the encoder to process the input image accordingly. The partition map is conveyed to the decoder so that the decoding process can be performed accordingly. In HEVC, the CTU size for the luma component (i.e., Y)—may be up to 64×64. The CU size is often referred to as 2N×2N. When the CU is split by the quadtree, it results in four N×N CUs.

In addition to the concept of coding unit, the concept of prediction unit (PU) is also introduced in HEVC. Once the splitting of CU hierarchical tree is done, each leaf CU is further split into prediction units (PUs) according to prediction type and PU partition. The Inter/Intra prediction process in HEVC is applied to the PU basis. For each 2N×2N leaf CU, a partition size is selected to partition the CU. A 2N×2N PU may be partitioned into 2N×2N, 2N×N, or N×2N PU when Inter mode is selected. When a 2N×2N PU is Intra coded, the PU may be partitioned into either one 2N×2N or four N×N.

Figure 2:
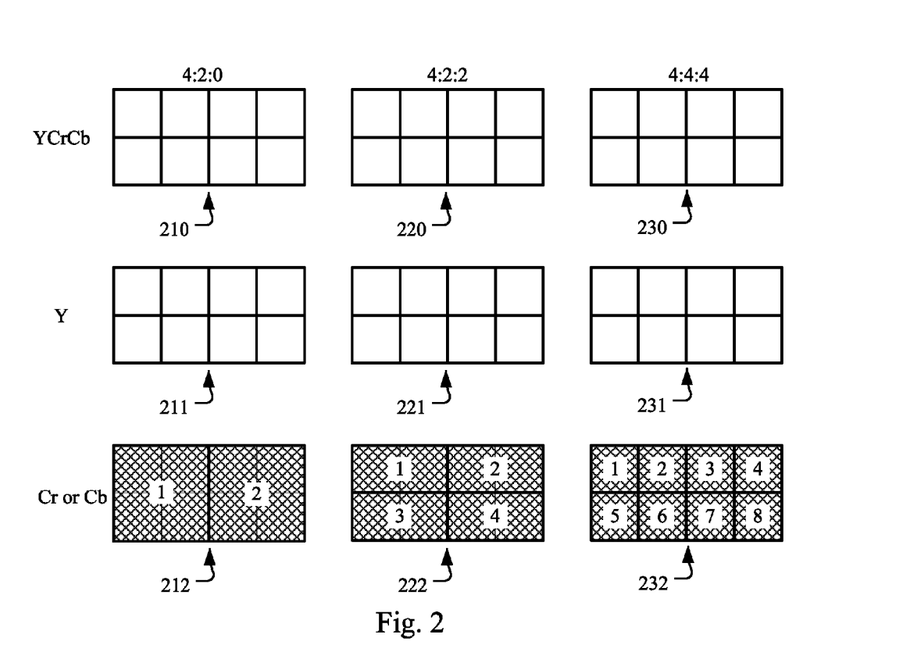
FIG. 2 illustrates sampling patterns for YUV420, YUV422 and YUV444 chroma sub-sampling formats.

In the HEVC standard, a coding profile, named Main Profile has been finalized and the Main Profile only supports color video in the YUV420 chroma subsampling format. Color video comprises multiple color components, and the color components in the form of luminance and chrominance are usually used in the field of video coding. Among various color component formats, YUV or YCrCb is often used for video coding. The YUV chroma subsampling format applies full sampling to the luma component (i.e., Y) and 2:1 horizontal subsampling and 2:1 vertical subsampling to the chroma component (i.e., Cr or Cb). FIG. 2 illustrates examples of sampling patterns associated with YUV420, YUV422 and YUV444 chroma sub-sampling patterns. An area of color samples (4 pixels×2 rows) is shown in block 210 for YUV420 chroma sub-sampling. The corresponding full sampling for the Y component is shown in block 211. For each chroma component (i.e. Cr or Cb), only two samples are formed, as indicated by shaded areas 1 and 2 in block 212 for the area of 4×2 color pixels. While the YUV420 format is widely used for general consumer applications, in some pro-consumer and professional applications, higher fidelity in colors is desirable and the YUV422 and YUV444 formats are used. For YUV422 chroma sub-sampling of an area of 4×2 color pixels 220, the sampling for the Y component 221 is the same as before. However, for the chroma component, the sub-sampling forms 2×2 sub-sampled pattern 222. For the YUV444 chroma sub-sampling of an area of 4×2 color pixels 230, the sampling for the Y component 231 is the same as before. However, for the chroma component, a full sampling (i.e., 1:1 sub-sampling) is used to form 4×2 sub-sampled pattern 232. The sampling locations for the chroma components may be aligned with the luma samples. Nevertheless, the sampling locations for the chroma components may also be offset from the luma samples horizontally, vertically or both horizontally and vertically.

Figure 3:
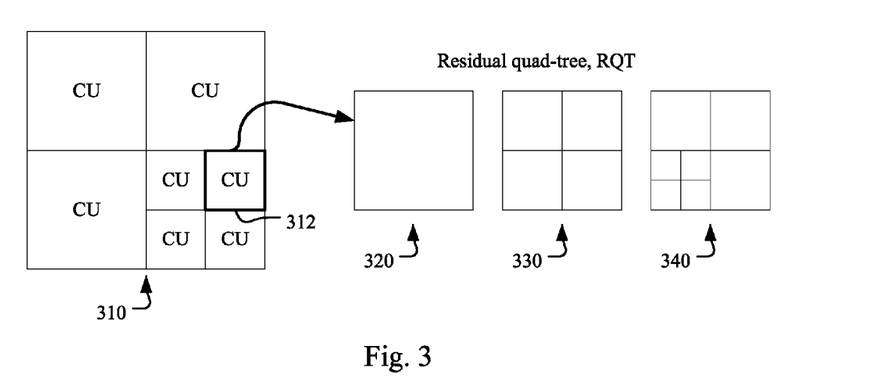
FIG. 3 illustrates an exemplary quadtree partition on a coding unit, where residue data associated with one leaf CU is processed by transform process using residue quadtree.

In HEVC Main Profile, quadtree split is applied to transform blocks, where the transform process is applied to each coding unit (CU) and uses the CU size as the initial transform unit (TU) size. Each TU can be partitioned by quadtree. FIG. 3 illustrates an example of quadtree partition of a TU. Block 310 corresponds to quadtree partition of a largest coding tree block (CTB) where each square corresponds to a leaf CU. Transform process is applied to the residues associated with a CU indicated by thick-lined block 312. The CTB can be 64×64, 32×32, 16×16 or 8×8. The initial TU 320 corresponds to the residues of a selected CU (i.e., block 312). The initial TU 320 is partitioned by quadtree to form next level TUs 330. TUs 330 can be further partitioned by quadtree to form TUs 340. The transform size for HEVC can be 32×32, 16×16, 8×8 or 4×4. When the YUV422 or YUV444 format is used, video coding tools and schemes for all these chroma sub-sampling formats will be needed. For example, the H.264/MPEG-4 AVC (Advanced Video Coding) standard includes a profile named Fidelity Range Extensions (FRExt), which enables higher quality video coding by supporting increased pixel bit depth and higher-resolution color formats, such as YUV422 and YUV444 chroma sub-sampling. It is desirable to develop coding tools such as structure and partitioning method for coding unit, prediction unit and transform unit associated with YUV422 and YUV444 chroma sub-sampling formats of the HEVC coding system.

SUMMARY

A method and apparatus for video data processing in a video coding system are disclosed, wherein the video data uses YUV422 or YUV 444 chroma sub-sampling pattern. In one embodiment of the present invention, for a 2N×2N luma coding unit (CU) and N×2N chroma CU of YUV422 video data, the transform process partitions residue data corresponding to the 2N×2N luma CU and N×2N chroma CU into square luma transform units (TUs) and square chroma TUs. The residue data associated with the luma CU and chroma CU are generated by applying prediction process on the luma CU and chroma CU. The transform process is independent of prediction block size or prediction mode associated with the prediction process. For a 2N×2N luma CU, the level 0 luma TU is 2N×2N and chroma TU is N×N. A 2N×2N luma TU at level 0 may be split into four N×N luma TUs at level 1. The N×N level-1 luma TU may be further split into four (N/2)×(N/2) luma TUs at level 2. An N×N chroma TU at level 0 may stay the same (i.e., N×N) at level 1. The N×N level-1 chroma CU may be further split into four (N/2)×(N/2) chroma TUs at level 2. Alternatively, the N×N chroma TU at level 0 may be split into four (N/2)×(N/2) chroma TUs at level 1. The (N/2)×(N/2) chroma TU at level 1 may be split into four (N/4)×(N/4) chroma TUs at level 2.

In another embodiment of the present invention, for a 2N×2N luma coding unit (CU) and N×2N chroma CU of YUV422 video data, the prediction process split the CU into two blocks (i.e., two prediction units, PUs) vertically or horizontally. The transform process partitions residue data corresponding to a luma PU into one or more luma TUs, and the transform process partitions residue data corresponding to a chroma PU into one or more chroma TUs. The residue data associated with the luma CU and the chroma CU are generated by applying prediction process on the luma CU and the chroma CU. The transform process is dependent on CU size and prediction block size associated with the prediction process, or it is dependent on the CU size and prediction mode associated with the prediction process, wherein the CU size is related to the luma CU, the chroma CU or both. For a 2N×2N luma CU, when prediction partition mode associated with the prediction process for the luma CU corresponds to 2N×N, 2N×nU, 2N×nD, N×2N, nL×2N or nR×2N, the transform process forces level-0 luma TUs to split into smaller level-1 luma TUs, wherein the level-0 luma TUs are associated with luma PUs generated by the prediction process for the luma CU using the prediction partition mode. When the prediction partition mode for the luma CU corresponds to 2N×N, 2N×nU, or 2N×nD, the level-1 luma TU size is 2N×(N/2) and the level-1 chroma TU size is N×N. The level-1 luma TU can be split into four level-2 luma TUs having size N×(N/4), and the level-1 chroma TU is split into four level-2 chroma TUs having size (N/2)×(N/2) or N×(N/4). When the prediction partition mode for the luma CU corresponds to N×2N, nL×2N or nR×2N, the level-1 luma TU size is 2N×(N/2) and the level-1 chroma TU size is N×N. The level-1 luma TU can be split into four level-2 luma TUs with a size (N/4)×N, and the level-1 chroma TU can be split into four level-2 chroma TUs with a size (N/4)×N.

In yet another embodiment of the present invention, when prediction partition mode for the luma CU corresponds to 2N×nU or 2N×nD, the transform process forces level-0 luma TUs to split into level-1 luma TUs with a size 2N×(N/2) and forces level-0 chroma TUs to split into level-1 chroma TUs with a size N×(N/4), wherein the level-0 luma TUs are associated with luma PUs generated by the prediction process for the luma CU using the prediction partition mode. The level-1 luma TU can be split into four level-2 luma TUs with a size N×(N/4), and the level-1 chroma TU can be split into four level-2 chroma TUs with a size (N/2)×(N/8) or (N/4)×(N/4). When prediction partition mode for the luma CU corresponds to nL×2N or nR×2N, the transform process forces level-0 luma TUs to split into level-1 luma TUs with a size (N/2)×2N and forces level-0 chroma TUs to split into level-1 chroma TUs with a size (N/4)×N, wherein the level-0 luma TUs are associated with luma PUs generated by the prediction process for the luma CU using the prediction partition mode. The level-1 luma TU is split into four level-2 luma TUs with a size N×(N/4), and the level-1 chroma TU is split into four level-2 chroma TUs with a size (N/2)×(N/8) or (N/4)×(N/4).

A first flag to indicate whether to split the luma TU and a second flag to indicate whether to split the chroma TU can be incorporated in the compressed video data, wherein the first flag and the second flag are determined independently. In another embodiment, one flag is used to indicate whether to split luma and chroma TUs, which cover the same regions in projected luma and chroma planes.

DETAILED DESCRIPTION

In HEVC, coding unit (CU), prediction unit (PU) and transform unit (TU) are introduced to improve the compression efficiency. In HEVC, the transform process is dependent on the CU size. The CU-TU relationship for the YUV420 format is listed in Table 1. In HEVC, the maximum TU size allowed is 32×32. Therefore, there is no level-0 TU allowed when the CU size is 64×64. On the other hand, the minimum TU size allowed is 4×4. Therefore, there is no level-2 TU allowed for a 4×4 chroma CU.

TABLE 1

| CU Size | | Level-0 | | Level-1 | | Level-2 | |
|---|---|---|---|---|---|---|---|
| No. of samples Y | No. of samples Cb/Cr | No. of samples Y | No. of samples Cb/Cr | No. of samples Y | No. of samples Cb/Cr | No. of samples Y | No. of samples Cb/Cr |
| 64 × 64 | 32 × 32 | — | — | 32 × 32 | 16 × 16 | 16 × 16 | 8 × 8 |
| 32 × 32 | 16 × 16 | 32 × 32 | 16 × 16 | 16 × 16 | 8 × 8 | 8 × 8 | 4 × 4 |
| 16 × 16 | 8 × 8 | 16 × 16 | 8 × 8 | 8 × 8 | 4 × 4 | 4 × 4 | 4 × 4 |
| 8 × 8 | 4 × 4 | 8 × 8 | 4 × 4 | 4 × 4 | 4 × 4 | — | — |

In the present invention, new CU-PU-TU structures are disclosed for video compression of video data using YUV422 and YUV444 chroma sub-sampling formats. The following illustrations are in the context of HEVC. However the new CU-PU-TU structures can also be used in other video coding systems. In one embodiment, the CU-PU-TU structures are disclosed for video data in the YUV444 format, where chroma blocks (i.e. Cb and Cr) use the same CU-PU-TU structures as that for the luma (Y) blocks in HEVC compression using the YUV420 format.

Figure 4:
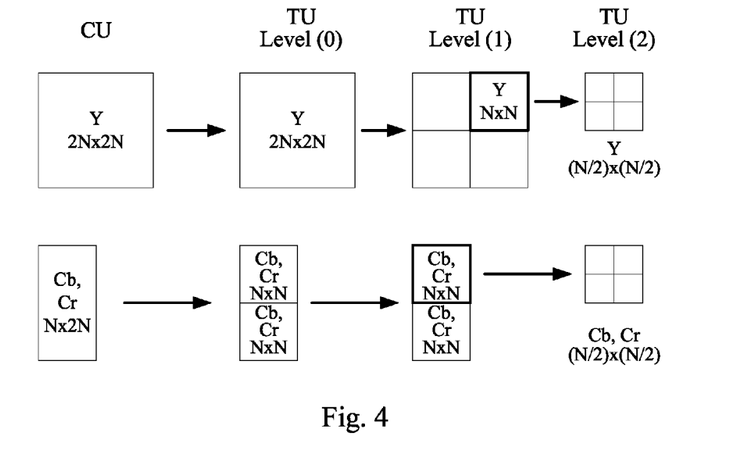
FIG. 4 illustrates an exemplary coding unit partition and transform process for the YUV422 chroma sub-sampling format according to an embodiment of the present invention, where all transform units are square.
Figure 5:
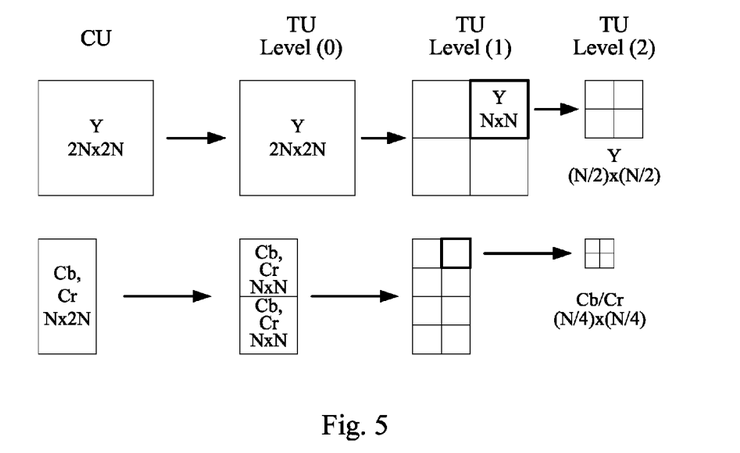
FIG. 5 illustrates another exemplary coding unit partition and transform process for the YUV422 chroma sub-sampling format according to an embodiment of the present invention, where all transform units are square.

In another embodiment, a CU-TU structure for YUV422 compression is disclosed as shown in Table 2. In this structure, TU sizes are only dependent on CU sizes and independent of PU sizes. Furthermore, only square TUs are allowed. In one embodiment, these square TUs utilize square-shaped transforms such as 2D discrete cosine transform (DCT) and 2D discrete sine transform (DST). For example, when the CU size is 2N×2N, it contains 2N×2N luma samples, N×2N Cb (U) samples and N×2N Cr (V) samples as shown in FIG. 4. For the root (i.e., level-0) transform process, the level-0 luma TU corresponds to 2N×2N luma residue data, while each N×2N chroma block is split into two N×N chroma TUs vertically. N×N transform can be applied to each of the two chroma TUs. In the next level (i.e., level-1) transform process, the example in FIG. 4 illustrates that the 2N×2N luma TU is split into four N×N luma TUs, which is the same as that in HEVC coding for video data in the YUV420 format. However, the chroma TU size in the next level (level-1) remains the same as level 0. The level-2 transform process for the luma block is the same as that in HEVC coding for video data in the YUV420 format, where each N×N chroma TU in level-1 can be further split into 4 chroma TUs using quadtree. The example in FIG. 4 illustrates that one of the N×N chroma block is further split into four (N/2)×(N/2) chroma TUs. In another embodiment, level-0 transform process is the same as what is described in FIG. 4. However, for the level-1 transform process, each N×N chroma TU in level-0 is further split into four (N/2)×(N/2) TUs as shown in FIG. 5. Therefore, the N×2N Cb or Cr samples associated with the 2N×2N luma CU are partitioned into eight (N/2)×(N/2) chroma TUs, as shown in FIG. 5. Each of the eight (N/2)×(N/2) chroma TUs can be further split into 4 (N/4)×(N/4) chroma TUs. The example shown in FIG. 5 illustrates that one of the eight (N/2)×(N/2) chroma TUs is split into 4 (N/4)×(N/4) chroma TUs. In the HEVC Main Profile, the maximum transform size allowed is 32×32 and the minimum transform size allowed is 4×4 for both luma and chroma components as shown in Table 2. The TU size limitation used by the HEVC Main Profile is also adopted in the present invention. Therefore, when a CU is larger than 32×32, the corresponding TU is automatically split into next level TUs with size 32×32 or smaller. Also, the TU quadtree split automatically stops when the TU size hits the minimum size of 4×4.

video data in YUV422 format is disclosed as shown in Table 3. In this structure, TU sizes are dependent on both CU sizes and PU sizes. Non-square shaped TUs and transforms are allowed. For a 2N×2N CU, if the PU is square, i.e. prediction partition mode is 2N×2N or N×N, the TU structure is the same as that shown in FIGS. 4-5 and Table 2. When the PU is non-square, i.e. prediction partition mode is 2N×N, N×2N, 2N×nU, 2N×nD, nL×2N or nR×2N, the TU structures are defined as in Table 3. The notations 2N×nU and 2N×nD refer to asymmetrical vertical partition, where 2N×nU corresponds to partition with narrower upper block and 2N×nD corresponds to partition with narrower lower block. The notations nL×2N and nR×2N refer to asymmetrical horizontal partition, where nL×2N corresponds to partition with

TABLE 2

| CU Size | | Level-0 | | Level-1 | | Level-2 | |
|---|---|---|---|---|---|---|---|
| Y | Cb/Cr | Y | Cb/Cr | Y | Cb/Cr | Y | Cb/Cr |
| 64 × 64 | 32 × 64 | — | — | 32 × 32 | Option 1: 32 × 32 Option 2: 16 × 16 | 16 × 16 | Option 1: 16 × 16 Option 2: 8 × 8 |
| 32 × 32 | 16 × 32 | 32 × 32 | 16 × 16 | 16 × 16 | Option 1: 16 × 16 Option 2: 8 × 8 | 8 × 8 | Option 1: 8 × 8 Option 2: 4 × 4 |
| 16 × 16 | 8 × 16 | 16 × 16 | 8 × 8 | 8 × 8 | Option 1: 8 × 8 Option 2: 4 × 4 | 4 × 4 | 4 × 4 |
| 8 × 8 | 4 × 4 | 8 × 8 | 4 × 4 | 4 × 4 | 4 × 4 | — | — |

In yet another embodiment of the present invention, a CU-PU-TU structure for a video compression system with narrower left block and nR×2N corresponds to partition with narrower right block.

TABLE 3

| CU Size | | PU Size | | TU Size | | | | | |
|---|---|---|---|---|---|---|---|---|---|
| | | | | Level-0 | | Level-1 | | Level-2 | |
| Y | Cb/Cr | Y | Cb/Cr | Y | Cb/Cr | Y | Cb/Cr | Y | Cb/Cr |
| 64 × 64 | 32 × 64 | 64 × 64 | 32 × 64 | — | — | 32 × 32 | 32 × 32 | 16 × 16 | 16 × 16 |
| | | 64 × 32 | 32 × 32 | — | — | 32 × 32 | 32 × 32 | 32 × 8 | 32 × 8 |
| | | 64 × 16, 64 × 48 | 32 × 16, 32 × 48 | | | | | | |
| | | 32 × 64 | 16 × 64 | — | — | 32 × 32 | 32 × 32 | 8 × 32 | 8 × 32 |
| | | 16 × 64, 48 × 64 | 8 × 64, 8 × 48 | | | | | | |
| 32 × 32 | 16 × 32 | 32 × 32 | 16 × 32 | 32 × 32 | 16 × 16 | 16 × 16 | 8 × 8 | 8 × 8 | 4 × 4 |
| | | 32 × 16 | 16 × 16 | — | — | 32 × 8 | 16 × 16 | 16 × 4 | Option 1: 8 × 8 Option 2: 16 × 4 |
| | | 32 × 8, 32 × 24 | 16 × 8, 16 × 24 | | | | | | |
| | | 16 × 32 | 8 × 32 | — | — | 8 × 32 | 8 × 16 | 4 × 16 | 4 × 16 |
| | | 8 × 32, 24 × 32 | 4 × 32, 12 × 32 | | | | | | |
| 16 × 16 | 8 × 16 | 16 × 16 | 8 × 16 | 16 × 16 | 8 × 8 | 8 × 8 | 4 × 4 | 4 × 4 | 4 × 4 |
| | | 16 × 8 | 8 × 8 | — | — | 16 × 4 | 8 × 8 | 4 × 4 | 4 × 4 |
| | | 16 × 4, 16 × 12 | 8 × 4, 8 × 12 | | | | | | |
| | | 8 × 16 | 4 × 16 | — | — | 4 × 16 | 4 × 16 | 4 × 4 | 4 × 4 |
| | | 4 × 16, 12 × 16 | 2 × 16, 6 × 16 | | | | | | |

TABLE 3-continued

| CU Size | | PU Size | | TU Size | | | | | |
|---|---|---|---|---|---|---|---|---|---|
| | | | | Level-0 | | Level-1 | | Level-2 | |
| Y | Cb/Cr | Y | Cb/Cr | Y | Cb/Cr | Y | Cb/Cr | Y | Cb/Cr |
| 8 × 8 | 4 × 8 | 8 × 8 | 4 × 8 | 8 × 8 | 4 × 4 | 4 × 4 | 4 × 4 | — | — |
| | | 8 × 4 | 4 × 4 | — | — | 4 × 4 | 4 × 4 | — | — |
| | | 4 × 8 | 2 × 8 (inter) 4 × 4 (intra) | — | — | 4 × 4 | 4 × 4 | — | — |
| | | 4 × 4 (intra only) | 4 × 4 (intra only) | — | — | 4 × 4 | 4 × 4 | — | — |

Figure 6:
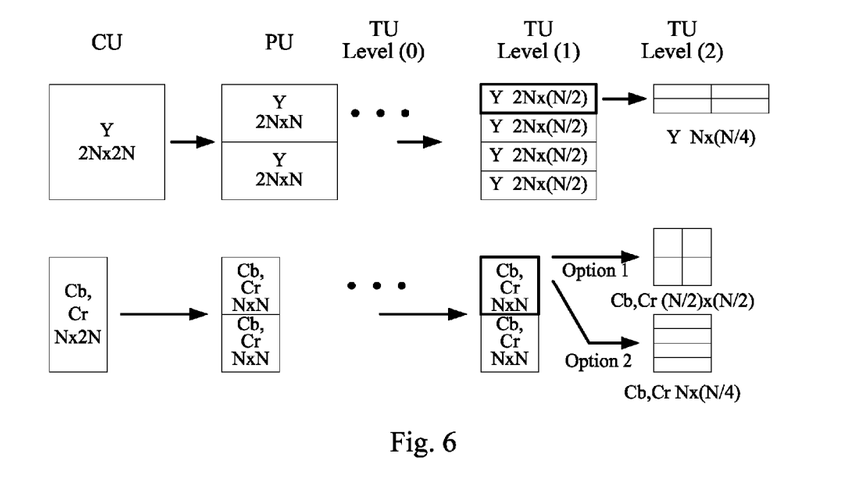
FIG. 6 illustrates an exemplary coding unit partition, prediction process and transform process for the YUV422 chroma sub-sampling format according to an embodiment of the present invention, where the coding unit is split vertically into two equal prediction units.

For a 2N×2N CU, if the PU size or partition mode is 2N×N, 2N×nU or 2N×nD and when Non-square shape TUs and Non-square transforms (NSQT) is enabled, the corresponding root (i.e., level-0) luma TUs are forced to split into next level (i.e. level-1) TUs. The level-1 luma TU size is 2N×(N/2), where N is 16 or smaller. When N is 32, the TU size is always restricted so that it will not go beyond 32 in horizontal and vertical directions. For level-1 luma TU, each 2N×N luma PU contains two luma TUs, as shown in FIG. 6. The level-1 chroma TU size is always forced to N×N. Therefore, each N×N chroma PU corresponds to one N×N chroma TU at level 1 as shown in FIG. 6. The level-1 TUs may be further split into next level (i.e. level-2) smaller TUs. Each level-1 luma TU with size 2N×(N/2) may be further split into four N×(N/4) luma TUs. There are two options for further splitting level-1 chroma TUs. In one embodiment, an N×N chroma TU can be further split into four (N/2)×(N/2) chroma TUs. In another embodiment, an N×N chroma TU can be further split into four N×(N/4) chroma TUs, as shown in FIG. 6.

Figure 7:
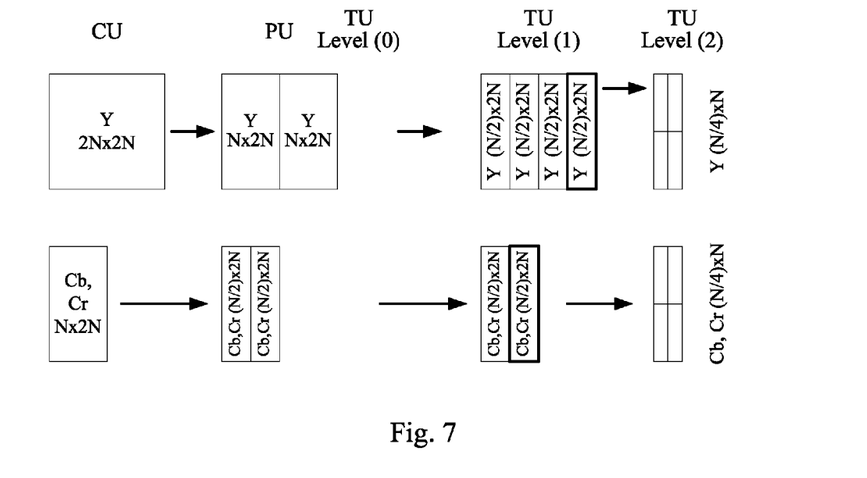
FIG. 7 illustrates an exemplary coding unit partition, prediction process and transform process for the YUV422 chroma sub-sampling format according to an embodiment of the present invention, where the coding unit is split horizontally into two equal prediction units.

For a 2N×2N CU, if the PU size or partition mode is N×2N, nL×2N or nR×2N and when NSQT is enabled, the root (level-0) TUs are forced to split into the next level (i.e. level-1) TUs as shown in FIG. 7. The level-1 luma TU size is (N/2)×2N, where N is 16 or smaller. When N is 32, the TU size is always restricted so that it will not go beyond 32 in horizontal and vertical directions. For level-1 luma TU, one N×2N luma PU contains two (N/2)×2N luma TUs. The level-1 chroma TU size is also (N/2)×2N and one (N/2)×2N chroma PU corresponds to one (N/2)×2N chroma TU. The level-1 TUs may be further split into next level (i.e. level-2) smaller TUs. Each level-1 (N/2)×2N luma TU is further split into four (N/4)×N luma TUs. Each level-1 (N/2)×2N chroma TU is also further split into four (N/4)×N chroma TUs as shown in FIG. 7.

In yet another set of embodiments, a CU-PU-TU structure for a video compression system with video data in the YUV422 format is disclosed as shown in Table 4. According to this embodiment, TU sizes are dependent on both CU sizes and PU sizes. Non-square shaped TUs and transforms are allowed. For a 2N×2N CU, if the prediction partition is symmetric, i.e. partition mode corresponds to 2N×2N, 2N×N, N×2N or N×N, the TU structure is the same as that as shown in FIG. 6, FIG. 7 and Table 3. When the prediction partition is asymmetric, i.e. partition mode is 2N×nU, 2N×nD, nL×2N and nR×2N, the TU structures are defined as in Table 4.

TABLE 4

| CU Size | | PU Size | | TU Size | | | | | |
|---|---|---|---|---|---|---|---|---|---|
| | | | | Level-0 | | Level-1 | | Level-2 | |
| Y | Cb/Cr | Y | Cb/Cr | Y | Cb/Cr | Y | Cb/Cr | Y | Cb/Cr |
| 64 × 64 | 32 × 64 | 64 × 16, 64 × 48 | 32 × 16, 32 × 48 | — | — | 32 × 8 | 32 × 8 | 16 × 4 | Option 1: 8 × 8 Option 2: 16 × 4 |
| | | 16 × 64, 48 × 64 | 8 × 64, 8 × 48 | | | 8 × 32 | 8 × 32 | 4 × 16 | Option 1: 8 × 8 Option 2: 4 × 16 |
| 32 × 32 | 16 × 32 | 32 × 8, 32 × 24 | 16 × 8, 16 × 24 | — | — | 32 × 8 | 16 × 4 | 16 × 4 | 4 × 4 |
| | | 8 × 32, 24 × 32 | 4 × 32, 12 × 32 | | | 8 × 32 | 4 × 16 | 4 × 16 | 4 × 4 |
| 16 × 16 | 8 × 16 | 16 × 4, 16 × 12 | 8 × 4, 8 × 12 | — | — | 16 × 4 | 4 × 4 | | |
| | | 4 × 16, 12 × 16 | 2 × 16, 6 × 16 | | | 4 × 16 | 4 × 4 | | |
| 8 × 8 | 4 × 8 | | | Same as in Table 3. | | | | | |

Figure 8:
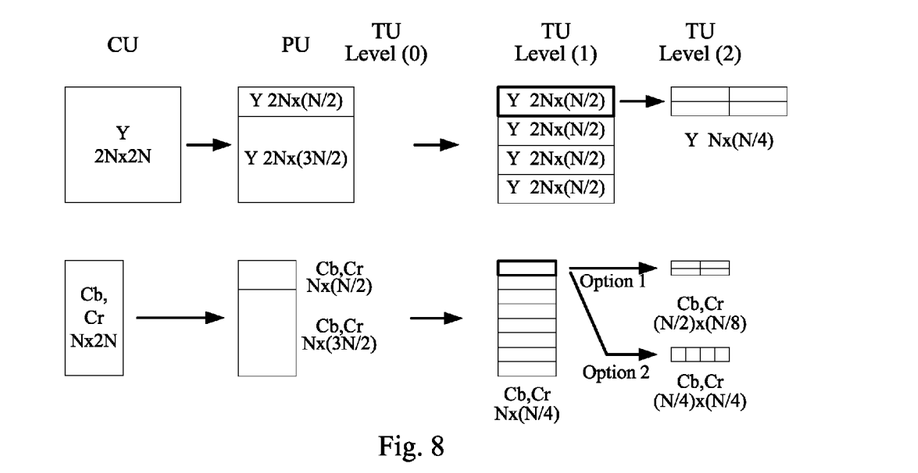
FIG. 8 illustrates an exemplary coding unit partition, prediction process and transform process for the YUV422 chroma sub-sampling format according to an embodiment of the present invention, where the coding unit is split vertically into two asymmetric prediction units.

For a 2N×2N CU, if the PU size or partition mode is 2N×nU or 2N×nD and when NSQT is enabled, the root (i.e., level-0) TUs are forced to split into next level (i.e. level-1) TUs. The level-1 luma TU size is 2N×(N/2) and the level-1 chroma TU size is N×(N/4), as shown in FIG. 8. The level-1 TUs may be further split into next level (i.e. level-2) smaller TUs. Each level-1 luma TU may be further split into four N×(N/4) luma TUs. There are two options for further splitting level-1 chroma TUs. In one embodiment, an N×(N/4) chroma TU may be further split into four (N/2)×(N/8) chroma TUs. In another embodiment, an N×(N/4) chroma TU may be further split into four (N/4)×(N/4) chroma TUs, as shown in FIG. 8.

Figure 9:
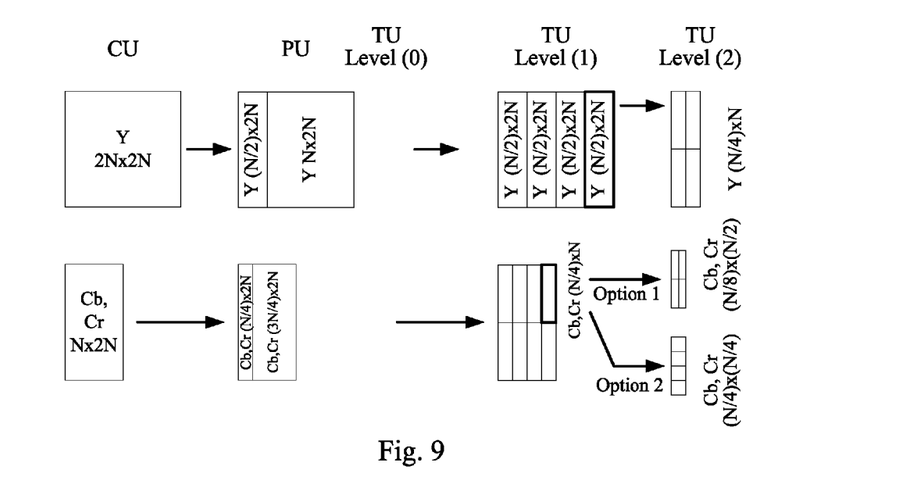
FIG. 9 illustrates an exemplary coding unit partition, prediction process and transform process for the YUV422 chroma sub-sampling format according to an embodiment of the present invention, where the coding unit is split horizontally into two asymmetric prediction units.

For a 2N×2N CU, if the PU size or partition mode is nL×2N or nR×2N and when NSQT is enabled, the root (i.e., level-0) TUs are forced to split into the next level (i.e. level-1) TUs. The level-1 luma TU size is (N/2)×2N and the level-1 chroma TU size is (N/4)×N as shown in FIG. 9. The level-1 TUs may be further split into next level (i.e. level-2) smaller TUs. There are two options for further splitting chroma TUs. In one embodiment, an (N/4)×N chroma TU may be further split into four (N/8)×(N/2) chroma TUs. In another embodiment, an (N/4)×N chroma TU may be further split into four (N/4)×(N/4) chroma TUs, as shown in FIG. 9.

In prior approaches to the CU-PU-TU structure disclosed by Silcock, et al. ("Extension of HM7 to Support Additional Chroma Formats", Doc. JCTVC-J0191, Joint Collaborative Team on Video Coding of ITU-T SG16 WP3 and ISO/IEC JTC1/SC29/WG11, Stockholm, S E, July 2012), Yuan, et al, ("Asymmetric Motion Partition with OBMC and Non-Square TU", Doc. JCTVC-E376, Joint Collaborative Team on Video Coding of ITU-T SG16 WP3 and ISO/IEC JTC1/SC29/WG11, Geneva, C H, March 2011) and Yuan, et al. ("CE2: Non-Square Quadtree Transform for symmetric motion partitions", Doc. JCTVC-F410, Joint Collaborative Team on Video Coding of ITU-T SG16 WP3 and ISO/IEC JTC1/SC29/WG11, Torino, I T, March 2011), the chroma TU always covers the same pixel area as the corresponding luma TU. However, the chroma TUs for a coding system using YUV422 format according to the present invention does not have to cover the same pixel area as the corresponding luma TU. Instead, the chroma TUs according to the present invention are more aligned with chroma prediction blocks.

In HEVC, one split_flag is used for Y, U and V components to indicate whether the current TU is split into next level smaller TUs. In other words, the Y, U and V TUs use the same partition in the conventional approach. In one embodiment of the present invention, one split_flag is used to specify TU split for Y, U and V components, similar to that is in HEVC. However, because the flag controls the same regions projected in luma and chroma domain, it may indicate one luma transform block split and more than one chroma transform block split at the same time. For example, a flag is shared between luma and chroma components indicating from level-0 to level-1 split and another flag is shared between luma and chroma components indicating from level-1 to level-2 split in FIG. 5. In another embodiment of the present invention, separate luma and chroma split flags are used, where split_flag_luma is used to indicate whether the luma TU is split into the next level smaller luma TUs and another flag, e.g. split_flag_chroma, is used to indicate whether the chroma (U and V) TU is split into the next level smaller TUs. The separate luma and chroma split flags can be used together with the CU-PU-TU structure according to the present invention as mention above. The separate luma and chroma split flags can also be used with other TU structures, such as those in conventional HEVC.

The CU-PU-TU structures according to the present invention may be applied to Inter prediction, Intra prediction, or both of Inter prediction and Intra prediction. The CU-PU-TU structures according to the present invention may be used as a whole, i.e., all levels of the CU-PU-TU structures according to present invention are used. Alternatively, any level of the CU-PU-TU structures may be used in combination with other known CU-PU-TU structures. For example, the root level TU sizes defined in other systems may be used while the level-1 or level-2 TU sizes and/or TU partitions of the CU-PU-TU structures according to the present invention may be used. Under the circumstance of Intra prediction, the pixel prediction is processed on TU when more than one TU belongs to the same PU. For example in FIG. 5 level-0, chroma pixels in the top N×N chroma TU are used for prediction of the pixels in the bottom N×N chroma TU, although all pixels in both N×N chroma TUs are predicted using the same prediction mode.

Figure 10:
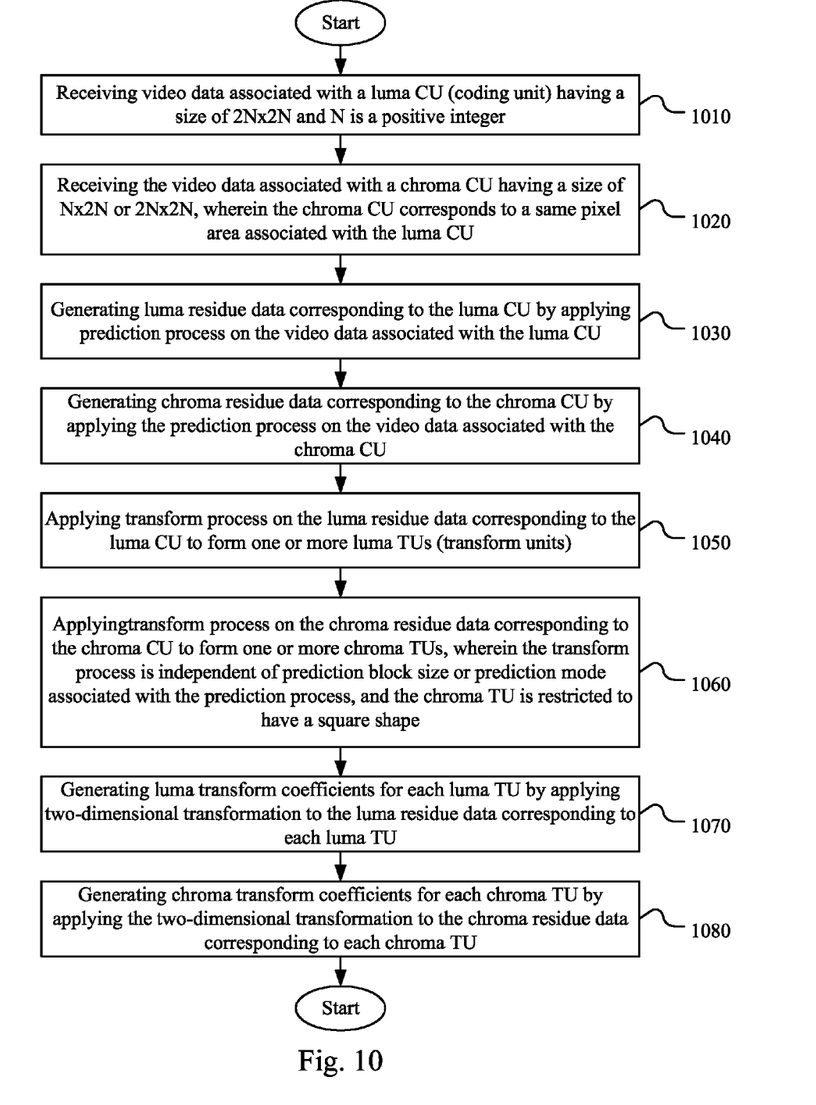
FIG. 10 illustrates an exemplary flow chart for a video coding system incorporating an embodiment of the present invention of coding unit partition, prediction process and transform process.

FIG. 10 illustrates an exemplary flowchart of video data processing in a video coding system incorporating an embodiment of the present invention, wherein the video data uses YUV422 or YUV 444 chroma sub-sampling pattern. The video data associated with a luma CU (coding unit) having size 2N×2N is received and N is a positive integer as shown in step 1010. The video data associated with a luma CU may be stored in a media such as a RAM or DRAM in a system. Therefore, the video data associated with a luma CU will have to be read back from a media. Also it is possible that the video data associated with a luma CU may be received directly from another processor (such as a central processing unit, a controller or a digital signal processor) responsible to generate the video data in YUV422 or YUV 444 format. For example, a processor may be used to convert GRB video into YUV422 or YUV 444 format. In this case, the processed-reconstructed pixels will be received from a processor. Similarly, the video data associated with a chroma CU having size N×2N or 2N×2N is received as shown in step 1020, wherein the chroma CU corresponds to a same pixel area associated with the luma CU. The luma residue data corresponding to the luma CU is generated by applying prediction process on the video data associated with the luma CU as shown in step 1030. The prediction may correspond to Intra prediction or Inter prediction. The prediction process also determines whether to split a prediction block and how to split a prediction block. Similarly, the chroma residue data corresponding to the chroma CU is generated by applying the prediction process on the video data associated with the chroma CU as shown in step 1040. After the residue data is generated, the transform process is applied on the luma residue data corresponding to the luma CU to form one or more luma TUs (transform units) as shown in step 1050. The transform process will determine whether to split a transform block and how to split a transform block. The transform process is applied on the chroma residue data corresponding to the chroma CU to form one or more chroma TUs as shown in step 1060, wherein the transform process is independent of prediction block size or prediction mode associated with the prediction process, and the chroma TU is restricted to have a square shape. After transform blocks are determined for a coding unit, luma transform coefficients are generated for each luma TU by applying two-dimensional transformation to the luma residue data corresponding to each luma TU as shown in step 1070 and chroma transform coefficients are generated for each chroma TU by applying the two-dimensional transformation to the chroma residue data corresponding to each chroma TU as shown in step 1080.

Figure 11:
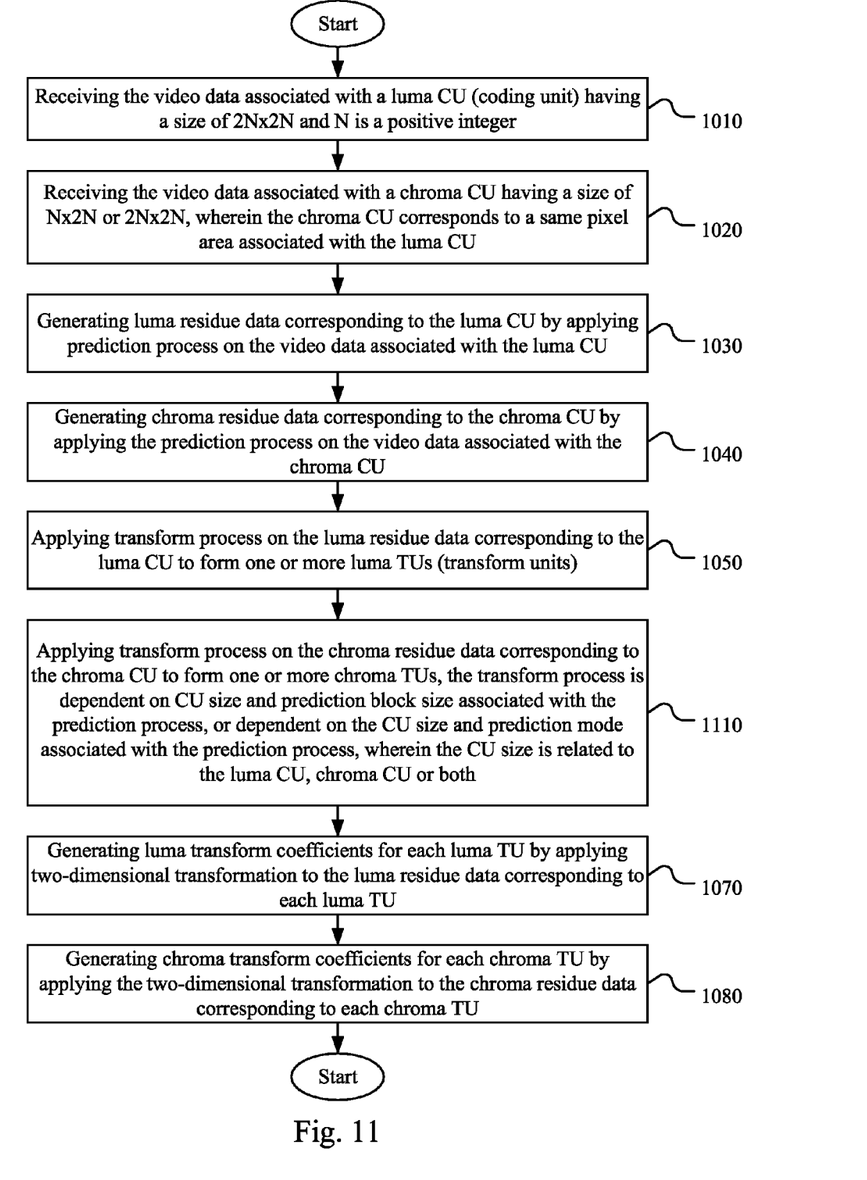
FIG. 11 illustrates another exemplary flow chart for a video coding system incorporating an embodiment of the present invention of coding unit partition, prediction process and transform process.

FIG. 11 illustrates another exemplary flowchart of video data processing in a video coding system incorporating an embodiment of the present invention, wherein the video data uses YUV422 chroma sub-sampling pattern. The flowchart of FIG. 11 is similar to the flowchart of FIG. 10 except that step 1060 is replaced by step 1110. In step 1110, the transform process is applied on the chroma residue data corresponding to the chroma CU to form one or more chroma TUs, wherein the transform process is dependent on CU size and prediction block size associated with the prediction process, or dependent on the CU size and prediction mode associated with the prediction process, wherein the CU size is related to the luma CU, the chroma CU or both.

The exemplary flowcharts shown in FIG. 10 and FIG. 11 are for illustration purpose. A skilled person in the art may re-arrange, combine steps or split a step to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of processing video data in a video coding system, wherein the video data uses YUV422 chroma sub-sampling pattern, the method comprising:
receiving video data associated with a luma CU (coding unit) having size 2N×2N and N is a positive integer;
receiving the video data associated with a chroma CU having size N×2N, wherein the chroma CU corresponds to a same pixel area associated with the luma CU;
generating luma residue data corresponding to the luma CU by applying prediction process on the video data associated with the luma CU;
generating chroma residue data corresponding to the chroma CU by applying the prediction process on the video data associated with the chroma CU, wherein applying the prediction process on the video data associated with the chroma CU comprises intra predicting pixels in a bottom N×N chroma TU using pixels in a top N×N chroma TU, wherein the top TU and the bottom TU belong to the chroma CU;
applying transform process on the luma residue data corresponding to the luma CU to form one or more luma TUs (transform units);
applying transform process on the chroma residue data corresponding to the chroma CU to form two N×N chroma TUs vertically, wherein the chroma TU is restricted to have a square shape and each N×N chroma TU is adaptively further split into four chroma TUs using a quadtree, the four chroma TUs being further split into smaller TUs using quadtree until a pre-defined minimum TU size is reached;
generating luma transform coefficients for each luma TU by applying two-dimensional transformation to the luma residue data corresponding to each luma TU; and
generating chroma transform coefficients for each chroma TU by applying the two-dimensional transformation to the chroma residue data corresponding to each chroma TU.

2. The method of claim 1, wherein the chroma TU size is dependent on the luma CU size, the chroma CU size, or both.

3. The method of claim 1, wherein the luma TU size at level 0 is 2N×2N and the chroma TU size at level 0 is N×N.

4. The method of claim 3, wherein the luma TU size at level 1 is N×N, and the chroma TU size at level 1 is either N×N or (N/2)×(N/2).

5. The method of claim 4, wherein the luma TU at level 1 or the chroma TU at level 1 is split into four smaller square TUs using a quadtree until the pre-defined minimum TU size is reached.

6. The method of claim 5, wherein the pre-defined minimum TU size is 4×4.

7. The method of claim 1, wherein a flag to indicate whether to split both the luma TU and the chroma TU is incorporated in compressed video data.

8. A method of processing video data in a video coding system, wherein the video data uses a YUV422 chroma sub-sampling pattern, the method comprising:
receiving video data associated with a luma CU (coding unit) having size 2N×2N and N is a positive integer;
receiving the video data associated with a chroma CU having size N×2N, wherein the chroma CU corresponds to a same pixel area associated with the luma CU;
generating luma residue data corresponding to the luma CU by applying prediction process on the video data associated with the luma CU;
generating chroma residue data corresponding to the chroma CU by applying the prediction process on the video data associated with the chroma CU, wherein applying the prediction process on the video data associated with the chroma CU comprises intra predicting pixels in a bottom N×N chroma TU using pixels in a top N×N chroma TU, wherein the top TU and the bottom TU belong to the chroma CU;
applying transform process on the luma residue data corresponding to the luma CU to form one or more luma TUs (transform units);
applying transform process on the chroma residue data corresponding to the chroma CU to form two chroma TUs vertically, wherein the transform process is dependent on CU size and prediction block size associated with the prediction process, or dependent on the CU size and prediction mode associated with the prediction process, wherein the CU size is related to the luma CU, the chroma CU or both, and wherein the chroma TU is restricted to have a square shape, the two chroma TU being further split into smaller TUs using quadtree until a pre-defined minimum TU size is reached;
generating luma transform coefficients for each luma TU by applying first two-dimensional transformation to the luma residue data corresponding to each luma TU; and
generating chroma transform coefficients for each chroma TU by applying second two-dimensional transformation to the chroma residue data corresponding to each chroma TU.

9. The method of claim 8, wherein for a square chroma PU (prediction unit) generated by the prediction process, the transform process is applied on the chroma residue data corresponding to the square chroma PU to generate one or more first square chroma TUs; and
for a rectangular chroma PU generated by the prediction process, the transform process is applied on the rectangular chroma residue data to generate one or more second square TUs.

10. The method of claim 8, wherein when prediction partition mode associated with the prediction process for the luma CU corresponds to 2N×N, 2N×nU, 2N×nD, N×2N, nL×2N or nR×2N, the transform process forces level-0 luma TUs to split into smaller level-1 luma TUs, wherein the level-0 luma TUs are associated with luma PUs generated by the prediction process for the luma CU using the prediction partition mode.

11. The method of claim 10, wherein when the prediction partition mode for the luma CU corresponds to 2N×N, 2N×nU, or 2N×nD, the level-1 luma TU size is 2N×(N/2) and the level-1 chroma TU size is N×N.

12. The method of claim 10, wherein when the prediction partition mode for the luma CU corresponds to N×2N, nL×2N or nR×2N, the level-1 luma TU size is 2N×(N/2) and the level-1 chroma TU size is N×N.

13. An apparatus of processing video data in a video coding system, wherein the video data uses YUV422 chroma sub-sampling pattern, the apparatus comprising at least one circuit configured for:
receiving video data associated with a luma CU (coding unit) having size 2N×2N and N is a positive integer;
receiving the video data associated with a chroma CU having size N×2N, wherein the chroma CU corresponds to a same pixel area associated with the luma CU;
generating luma residue data corresponding to the luma CU by applying prediction process on the video data associated with the luma CU;
generating chroma residue data corresponding to the chroma CU by applying the prediction process on the video data associated with the chroma CU, wherein applying the prediction process on the video data associated with the chroma CU comprises intra predicting pixels in a bottom N×N chroma TU using pixels in a top N×N chroma TU, wherein the top TU and the bottom TU belong to the chroma CU;
applying transform process on the luma residue data corresponding to the luma CU to form one or more luma TUs (transform units);
applying transform process on the chroma residue data corresponding to the chroma CU to form two N×N chroma TUs vertically, wherein the chroma TU is restricted to have a square shape;
generating luma transform coefficients for each luma TU by applying two-dimensional transformation to the luma residue data corresponding to each luma TU and each N×N chroma TU is adaptively further split into four chroma TUs using a quadtree, the four chroma TUs being further split into smaller TUs using quadtree until a pre-defined minimum TU size is reached; and
generating chroma transform coefficients for each chroma TU by applying the two-dimensional transformation to the chroma residue data corresponding to each chroma TU.

14. A method of processing a block of video data in a video decoder, wherein the video data uses a YUV422 chroma sub-sampling pattern, the method comprising:
receiving luma transform coefficients of each luma TU (transform unit) associated with a luma CU (coding unit) having size 2N×2N and N is a positive integer;
receiving chroma transform coefficients of each chroma TU associated with a chroma CU having size N×2N, wherein the chroma CU corresponds to a same pixel area associated with the luma CU;
generating luma residue block for each luma TU by applying inverse two-dimensional transformation to the luma transform coefficients of each luma TU, wherein all luma TUs are square;
generating chroma residue block for each chroma TU by applying inverse two-dimensional transformation to the chroma transform coefficients of each chroma TU, wherein all chroma TUs are square;
generating the chroma residue block associated with the chroma CU from the chroma residue blocks of the chroma TUs associated with the chroma CU, wherein the N×2N chroma CU is split into two N×N chroma TUs vertically and each N×N chroma TU is adaptively further split into four chroma TUs using a quadtree, the four chroma TUs being further split into smaller TUs using quadtree until a pre-defined minimum TU size is reached; and
applying prediction process to the chroma CU to reconstruct the video data associated with the chroma CU, wherein applying the prediction process on the chroma CU consisting a top N×N chroma TU and a bottom N×N chroma TU comprises intra predicting pixels in the bottom N×N chroma TU using pixels in the top N×N chroma TU, wherein sizes of the chroma TUs associated with the chroma CU are independent of prediction block size and prediction mode associated with the prediction process, wherein the top TU and the bottom TU belong to the chroma CU.

* * * * *